US006912426B1

(12) United States Patent
Kerner

(10) Patent No.: US 6,912,426 B1
(45) Date of Patent: Jun. 28, 2005

(54) METHOD FOR DETERMINING TIME CONSTANTS OF A REFERENCE MODEL IN A CASCADE CONTROLLING CIRCUIT

(75) Inventor: Norbert Kerner, Traunwalchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 125 days.

(21) Appl. No.: 10/089,321

(22) PCT Filed: Sep. 21, 2000

(86) PCT No.: PCT/EP00/09232

§ 371 (c)(1),
(2), (4) Date: Jul. 29, 2002

(87) PCT Pub. No.: WO01/23967

PCT Pub. Date: Apr. 5, 2001

(30) Foreign Application Priority Data

Sep. 24, 1999 (DE) .......................... 199 45 748

(51) Int. Cl.[7] .............................................. G05B 11/01
(52) U.S. Cl. ............................ 700/8; 700/29; 700/35; 700/41; 700/75; 700/173; 700/174; 703/2; 318/607; 318/609; 318/611; 331/1 R; 331/25; 331/65
(58) Field of Search ................................ 700/8, 28–35, 700/37, 40–43, 75, 108, 173, 174, 280; 703/2; 318/561, 607–611, 629, 630; 331/1 R, 65, 85, 25; 363/39

(56) References Cited

U.S. PATENT DOCUMENTS

| 4,095,167 A | * | 6/1978 | Weber .......................... 324/326 |
| 4,549,123 A | | 10/1985 | Hagglund et al. .......... 318/610 |
| 4,691,276 A | * | 9/1987 | Miller et al. ................... 700/47 |
| 4,903,192 A | | 2/1990 | Saito et al. .................... 700/37 |
| 5,157,597 A | | 10/1992 | Iwashita ........................ 700/37 |
| 5,282,130 A | * | 1/1994 | Molnar ........................... 700/37 |
| 5,319,296 A | * | 6/1994 | Patel ............................. 318/611 |
| 5,533,565 A | * | 7/1996 | Kodaira et al. .............. 164/416 |
| 5,621,656 A | * | 4/1997 | Langley ........................ 700/280 |
| 5,844,448 A | * | 12/1998 | Jackoski et al. ............. 331/158 |
| 6,127,793 A | | 10/2000 | Kerner .......................... 318/561 |
| 6,236,182 B1 | * | 5/2001 | Kerner .......................... 318/609 |
| 6,274,995 B1 | | 8/2001 | Kerner .......................... 318/617 |
| 6,330,484 B1 | * | 12/2001 | Qin ............................... 700/50 |
| 6,591,822 B2 | * | 7/2003 | Dohta ........................... 123/672 |
| 6,678,621 B2 | * | 1/2004 | Wiener et al. ................. 702/75 |
| 2003/0078681 A1 | * | 4/2003 | Dubois et al. ................ 700/31 |
| 2003/0153990 A1 | * | 8/2003 | Boiko ........................... 700/37 |

FOREIGN PATENT DOCUMENTS

| DE | 38 11 086 | 10/1988 | .......... G05B/13/02 |
| EP | 0 896 263 | 2/1999 | .......... G05B/13/00 |
| WO | WO 00/22485 | 4/2000 | ............ G05B/5/01 |

OTHER PUBLICATIONS

P. Poignet et al., "Modeling, Control and Simulation of High Speed Machine Tool Axes", Proceedings of the 1999 IEEE/ASME International Conference on Advanced Intelligent Mechatronics, Sep. 19–23, 1999, pp. 617–622.*

(Continued)

*Primary Examiner*—Anthony Knight
*Assistant Examiner*—Crystal J Barnes
(74) *Attorney, Agent, or Firm*—Brinks Hofer Gilson & Lione

(57) ABSTRACT

A method for determining at least one time constant of a reference model, which is designed as a 2nd order time-delay element of a machine. The method includes detecting an oscillation frequency of an undamped machine oscillation and determining an optimized value of a time constant of the reference model as a function of the detected oscillation frequency of the undamped machine oscillation.

21 Claims, 14 Drawing Sheets

OTHER PUBLICATIONS

M. T. Pham et al., Automatic Tuning of Cascade Structure CNC Controllers, Proceedings of the 6th International Workshop on Advanced Motion Control, 30 Mar.–1, Apr. 2000, pp. 390–395.*

T. Dibble et al., "Frequency Response Characterization of Current Meters", OCEANS, Sep. 1981, vol. 13, pp. 250–256.*

Michael G. Ott et al., "Auto–Tuning: From Ziegler–Nichols to Model Based Rules," Advances in Instrumentation and Control, Instrument Society of America, vol. 50, No. Part 2, 1999, pp. 323–332.

Peter Ernst et al., "Optimierte Achsregelungen Mit Durchgangin Offenen CNC–Steuerungen," ISW Position Controlling Seminar 1999, vol. 26, Mar. 27, 1999, pp. 1–30.

* cited by examiner

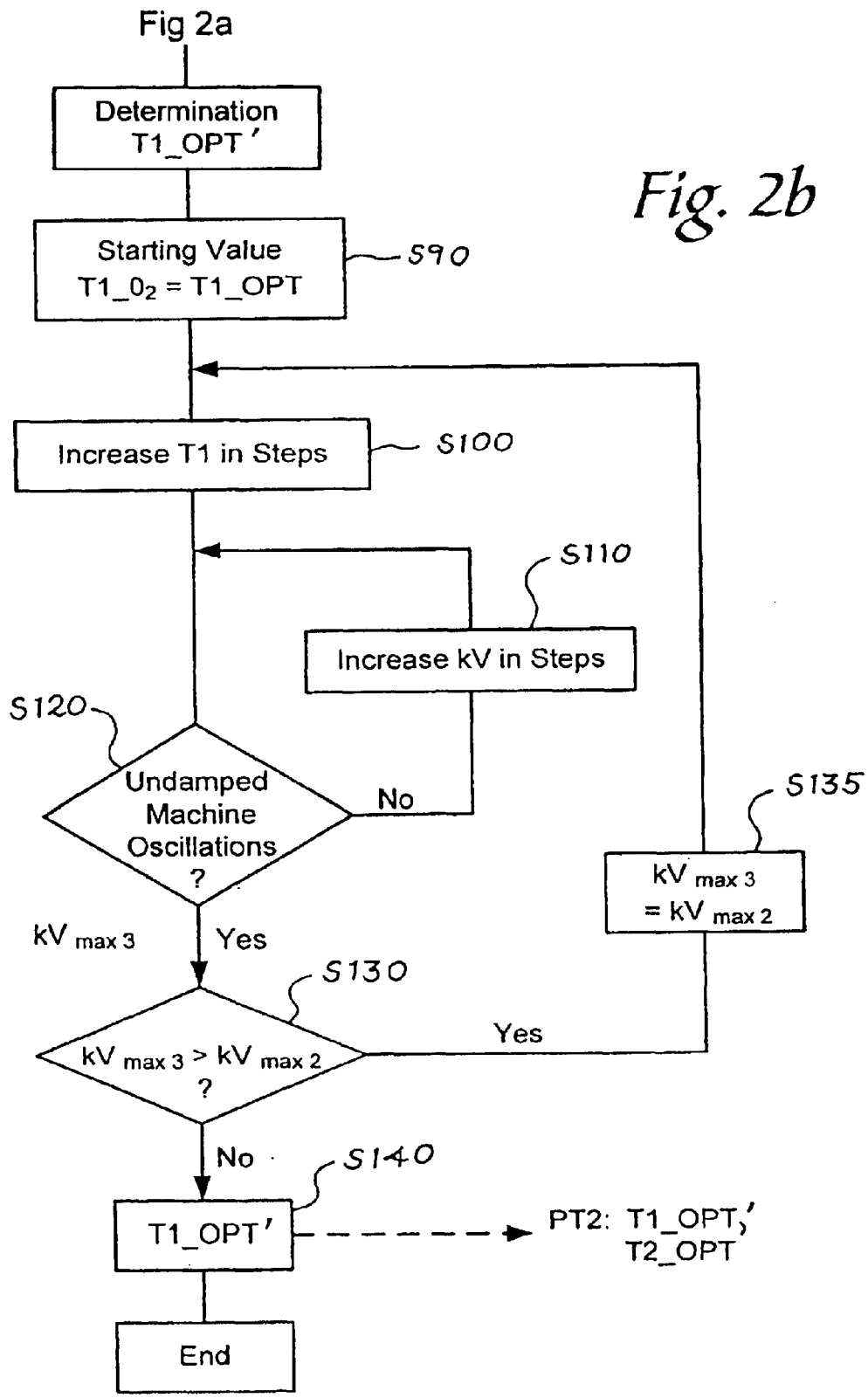

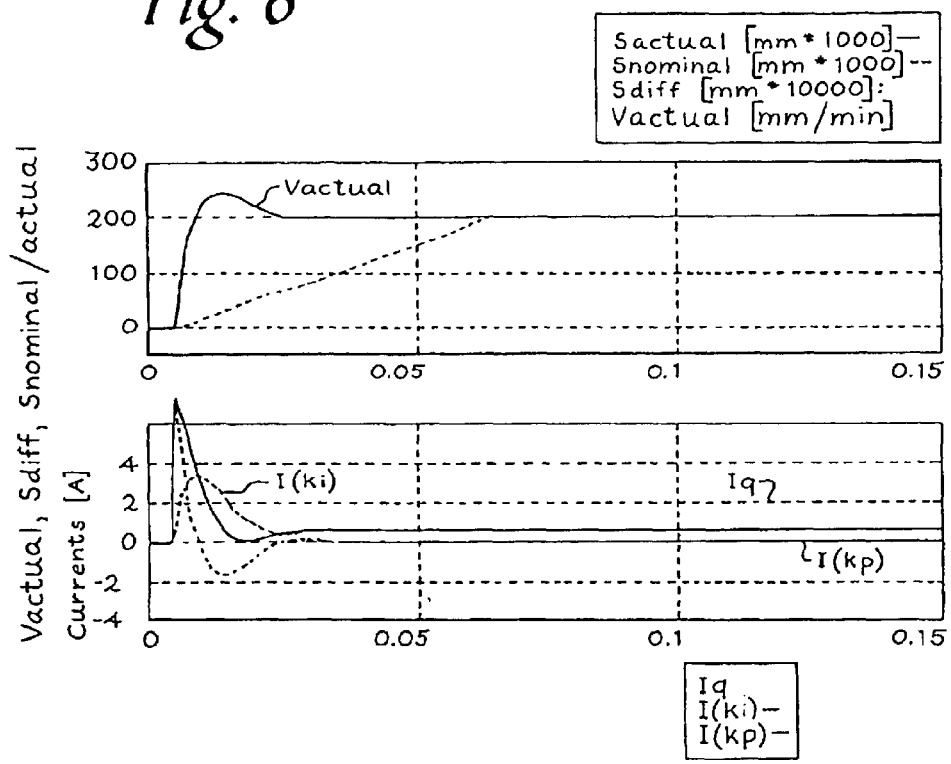
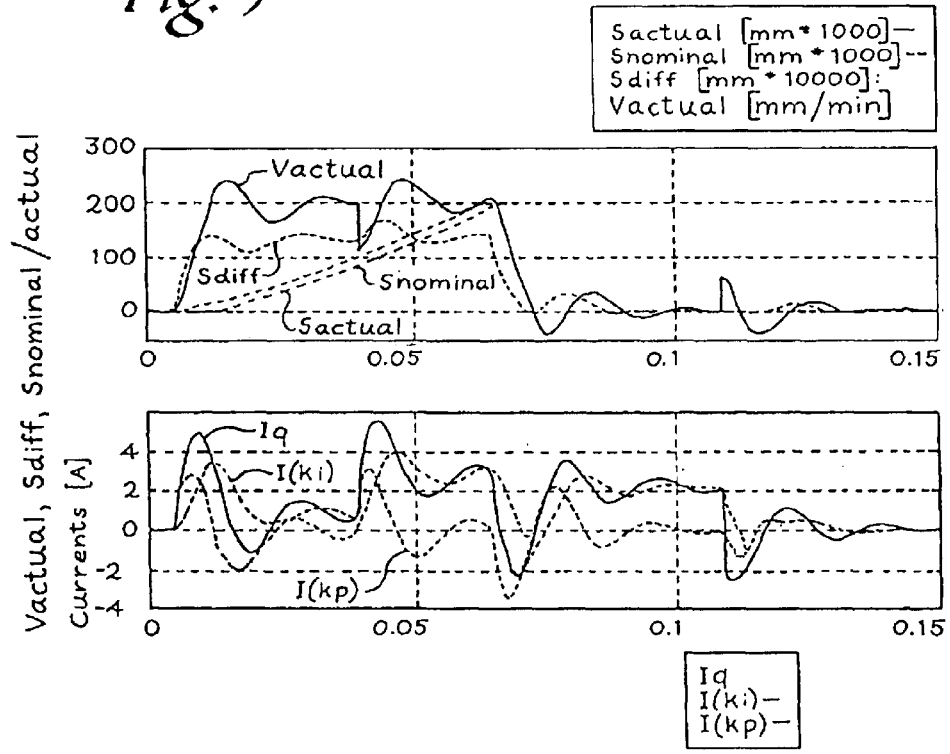

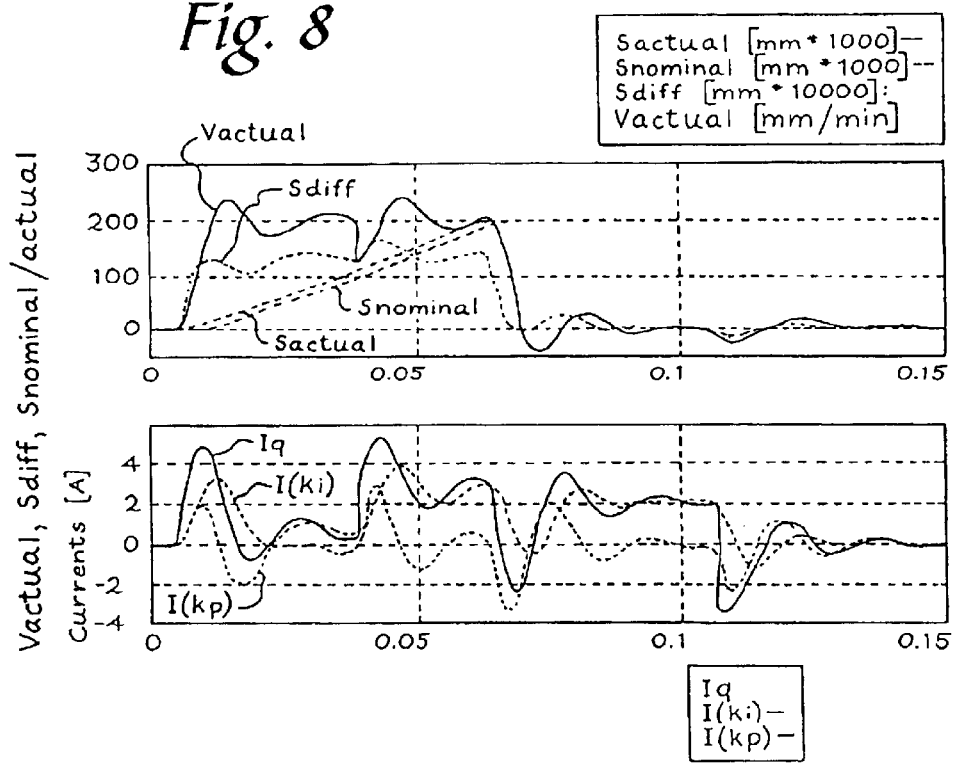
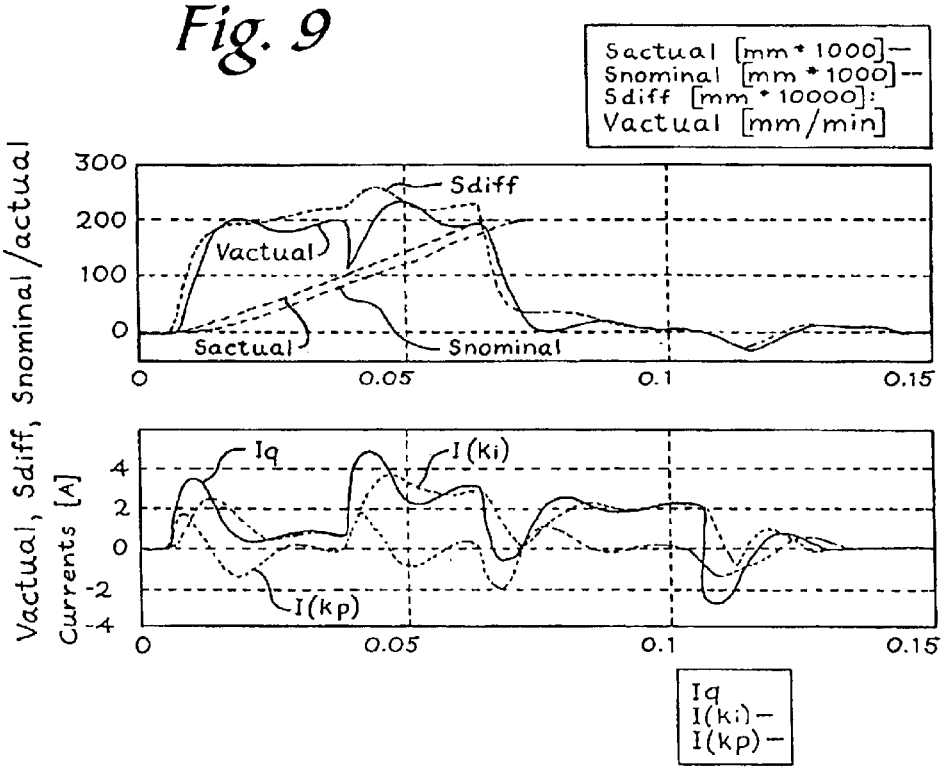

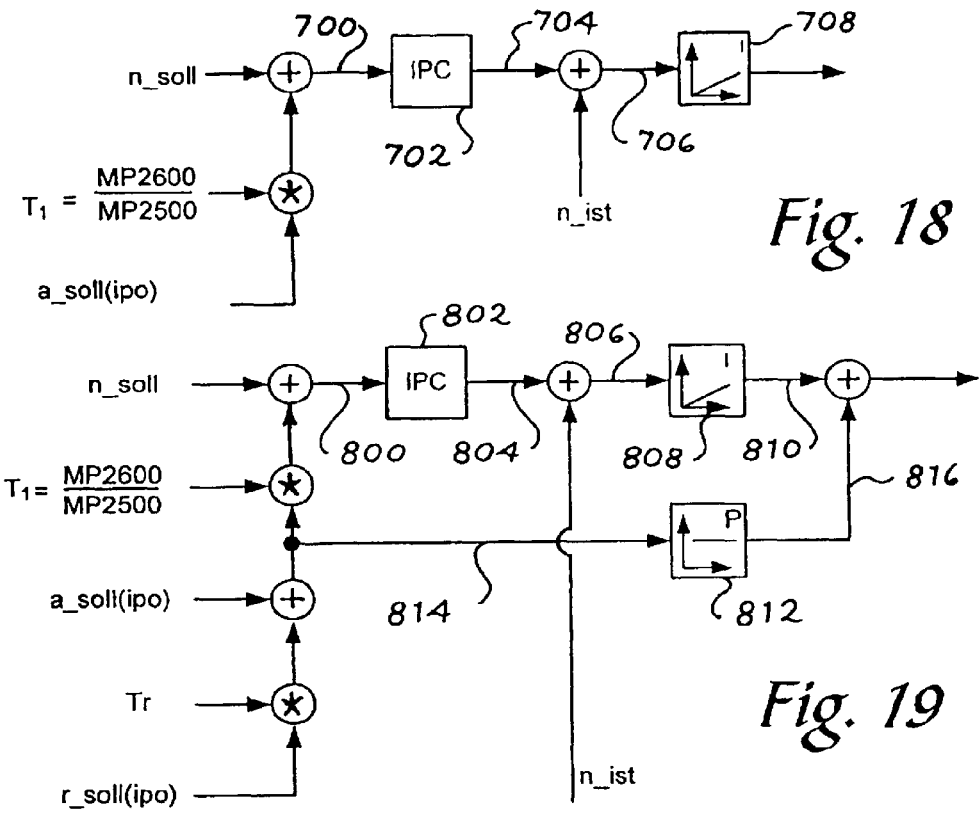
*Fig. 18*
*Fig. 19*
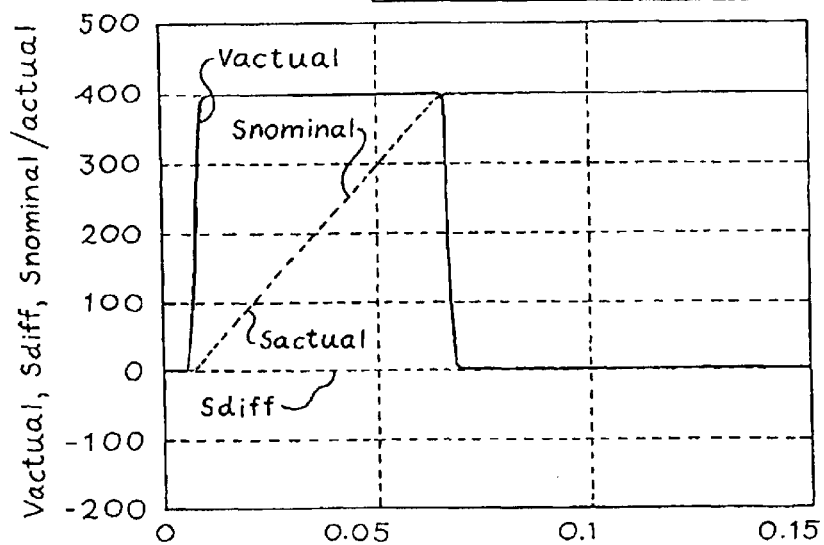
*Fig. 20*

© 1

METHOD FOR DETERMINING TIME CONSTANTS OF A REFERENCE MODEL IN A CASCADE CONTROLLING CIRCUIT

Applicant claims, under 35 U.S.C. §§ 120 and 365, the benefit of priority of the filing date of Sep. 21, 2000 of a Patent Cooperation Treaty patent application, copy attached, Ser. No. PCT/EP00/09232, filed on the aforementioned date, the entire contents of which are incorporated herein by reference, wherein Patent Cooperation Treaty patent application Ser. No. PCT/EP00/09232 was not published under PCT Article 21(2) in English.

Applicant claims, under 35 U.S.C. § 119, the benefit of priority of the filing date of Sep. 24, 1999 of a German patent application, copy attached, Ser. No. 199 45 748.4, filed on the aforementioned date, the entire contents of which are incorporated herein by reference.

BACKGROUND OF THE INVENTION

1. Field of the Invention

The present invention relates to a method for determining at least one time constant of a reference model in a cascaded controlling arrangement.

2. Description of the Related Art

Usually a cascaded controlling structure, including a position, rpm and current control device, is employed in numerically controlled machine tools. As a rule, the speed control device, which is connected downstream of the position control device, is embodied as a PI speed control device and includes a proportional branch (P) and an integral branch (I). The phase response of the upstream connected position control device worsens as a result of the effect of the integral branch of the speed control device. It is therefore necessary as a consequence of this to reduce the loop gain kV of the position control device a priori in order to prevent oscillations in the drive systems of the machine tool controlled by the controlling device. However, as large as possible a loop gain kV of the position control device is desired in principle.

To solve these problems, it has already been suggested by P. Ernst and G. Heinemann in the course of a seminar presentation under the title "Optimierte Achsregelung mit durchgängig offenen CNC-Steuerungen" [Optimized Axis Control with Continuously Open CNC Controls] (ISW Position Controlling Seminar 1999, 26, Mar. 27, 1999) in Chapter 2.2 to connect a reference model upstream of the speed control device. The reference model, designed as a 2nd order time-delay element, is matched to the behavior of the closed speed control device without an integral portion. It is possible in this way to eliminate, or at least to minimize, the detrimental influence of the integral portion on the control behavior of the speed control device. However, the desired elimination of disturbances without integral portions continues to be fully maintained. However, no further suggestions can be found in the cited reference regarding suitable parameterization, in particular the determination of suitable time constants, of a corresponding 2nd order reference model.

SUMMARY AND OBJECTS OF THE INVENTION

It is therefore an object of the present invention to disclose a method for determining at least one time constant of a 2nd order reference model, which is arranged in a cascaded controlling device of a machine between a position control device and an speed control device, and which assures an optimized control behavior of the controlling device.

This object is attained by a method for determining at least one time constant of a reference model, which is designed as a 2nd order time-delay element of a machine. The method includes detecting an oscillation frequency of an undamped machine oscillation and determining an optimized value of a time constant of the reference model as a function of the detected oscillation frequency of the undamped machine oscillation.

The parameterization of a suitable 2nd order reference model for the most varied types of machines is now possible by the method of the present invention. Here, the resulting reference model essentially always assures that at least the undesired influence of the integral portion of the speed control device on the control behavior is eliminated.

It should be noted that the machine tools controlled in the past and by the present invention can generally thought of as falling with one of two categories. One category or type of machine tool regards rigid machines that are not too large in structural size, which is mostly directly driven or has linear motors. A second category or type of machine tool regards machine tools with a dominant natural frequency in the range between 15 Hz to 80 Hz, in which no sufficiently large kV factor can be set.

Depending on the machine type, one time constant or two time constants are determined in accordance with the present invention, which determine the behavior of the reference model and therefore affect the control behavior of the controlling arrangement during the actual controlling operation. However, in accordance with the present invention at least the so-called second time constant of the reference model is basically determined as a function of a detected oscillation frequency of a continuous machine oscillation.

Surprisingly, or contrary to theoretical reflections, it is now possible by the steps of the present invention for determining the time constant to also compensate controlled systems with idle times and delay elements for machines which theoretically would require higher order reference models; this applies in particular to the above mentioned category of non-rigid machines with dominant natural frequency. The determination of theoretically exact nth-order reference models (n>2) in such machines would be connected with a very large outlay. In contrast to this it is possible by the use of second order time-delay elements as the reference model, whose time constants are determined in accordance with the present invention, to keep the resulting outlay for parameterization of the reference model low.

The method in accordance with the present invention can be performed manually, as well as in an automated manner.

Further advantages, as well as details of the method in accordance with the present invention ensue from the subsequent description of exemplary embodiments by the attached drawings.

Shown here are in:

BRIEF DESCRIPTION OF THE DRAWINGS

FIGS. 2a and 2b show a flow diagram in each for explaining an embodiment of a method of the determination, in accordance with the present invention, of the time constant of a 2nd order reference model to be used with the cascaded controlling structure of FIG. 1;

FIGS. 3 to 21, respectively different representations, which will be explained in greater detail hereinafter.

DESCRIPTION OF THE PREFERRED EMBODIMENT(S) OF THE INVENTION

Figure 1:
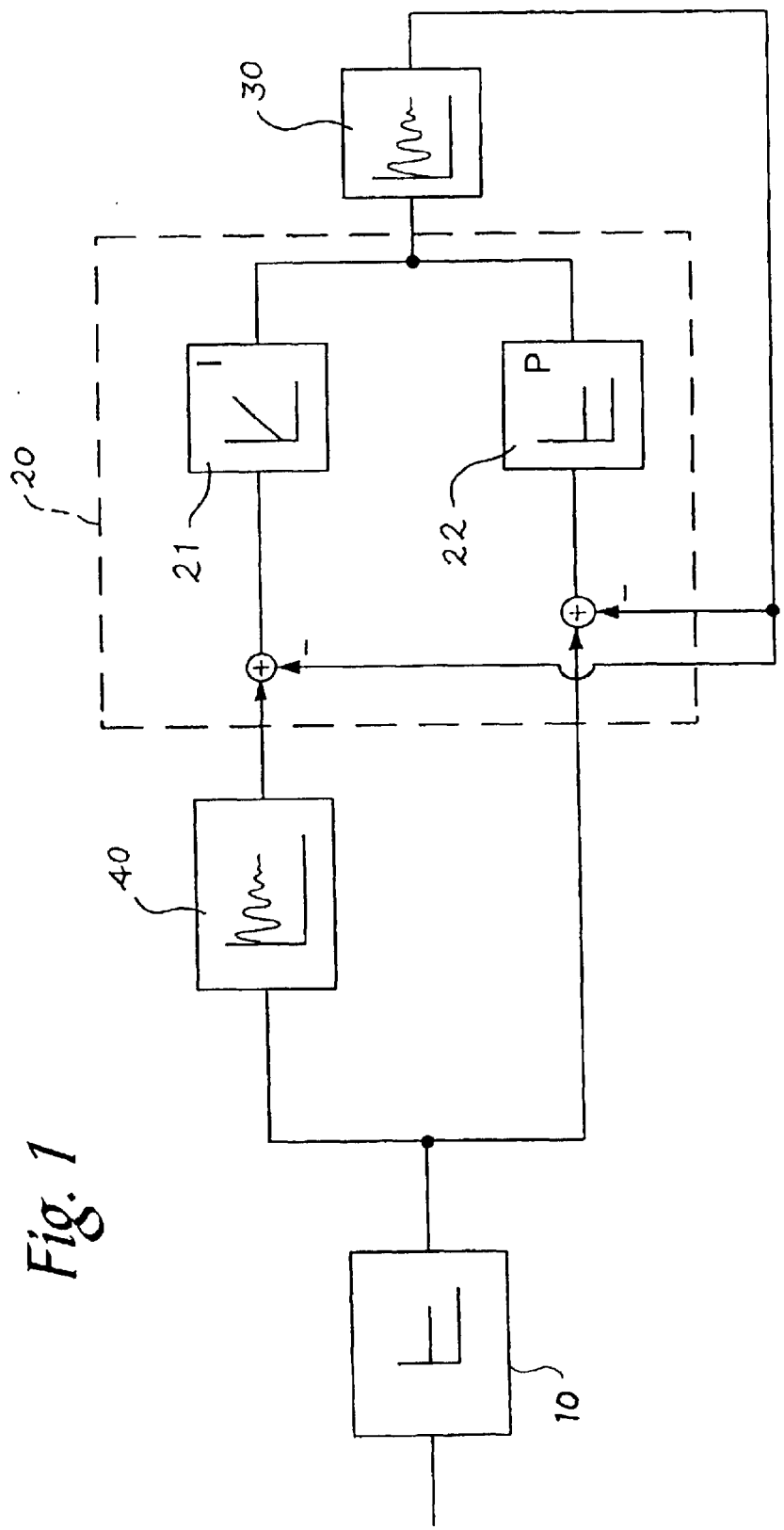
FIG. 1 shows a block diagram representation of a part of an embodiment of a cascaded controlling structure of a numerically controlled machine tool in accordance with the present invention.

In a greatly schematized form, FIG. 1 shows a block diagram representation of a part of a cascade controlling structure of a numerically controlled machine tool, such as is known, for example, in a similar shape from the above discussed reference.

The portion of the controlling structure represented includes a position control device 10, as well as a downstream-connected speed control device 20. The actual controlled system 30 is arranged downstream of the speed control device 20 and is only schematically indicated. In the present example, the speed control device is embodied as a PI control device (proportional-integral control device); the integral branch 21, as well as the proportional branch 22 of the speed control device 20 are represented separately of each other in FIG. 1. A reference model 40 is arranged between the position control device 10 and the speed control device and is embodied as a 2nd order time-delay element, i.e. a so-called PT2 element. The reference model 40 simulates the behavior of the closed speed control device 20 without an integral portion and in this way assures that at least the undesired influence of the integral portion, or integral branch 21, on the control behavior of the speed control device is eliminated. As already indicated above, by the steps to be explained in what follows it is possible in a surprising manner to also parameterize reference models which compensate controlled systems with idle times and delay elements. In theory it would be necessary to parameterize reference models with orders n>2 for such controlled systems, which would be relatively expensive.

The transfer function H(s) of the reference model 40 embodied as a 2nd order time-delay element results in a known manner from the following equation (1):

$$H(s)=K/(1+T1*s+(T2)^{2}*s^{2}) \qquad \text{Equ. (1)}$$

The two time constants T1 and T2 are decisive for the layout, or the parameterization of the reference model 40. They must be determined as a function of the respective machine, or of the controlling conditions.

Contrary to theoretical considerations it is shown by the present invention that the use of 2nd order reference models, whose time constants T1 and T2 are determined in accordance with the present invention, is even possible when the respective system would actually have to be simulated by a reference model of higher order n, i.e. n>2. However, the mathematically exact representation of such a complex system by an appropriate nth order reference model would basically cause an extremely high computational effort. In actuality this has the result that by the use of a 2nd order reference model whose time constants T1 and T2 are determined by means of the invention, it is possible to also optimize the control behavior of the speed control device 20 for machines which are part of the second category already discussed above. Here, by employing a 2nd order reference model, which is parameterized in accordance with the present invention, in these systems, not only is the influence of the integral branch of the speed control device eliminated, but moreover the influence of additional delays, or idle times, in the controlled system is also minimized. It is surprisingly possible to use loop gains kV in such systems with 2nd order reference models parameterized in accordance with the present invention, which are greater than possible loop gains kV in case of a non-existing, or switched off integral branch in the speed control device.

The operation in accordance with the present invention for determining the time constants T1, T2 for the 2nd order reference model will now be explained by the flow diagrams in FIGS. 2a and 2b.

Figure 2A:
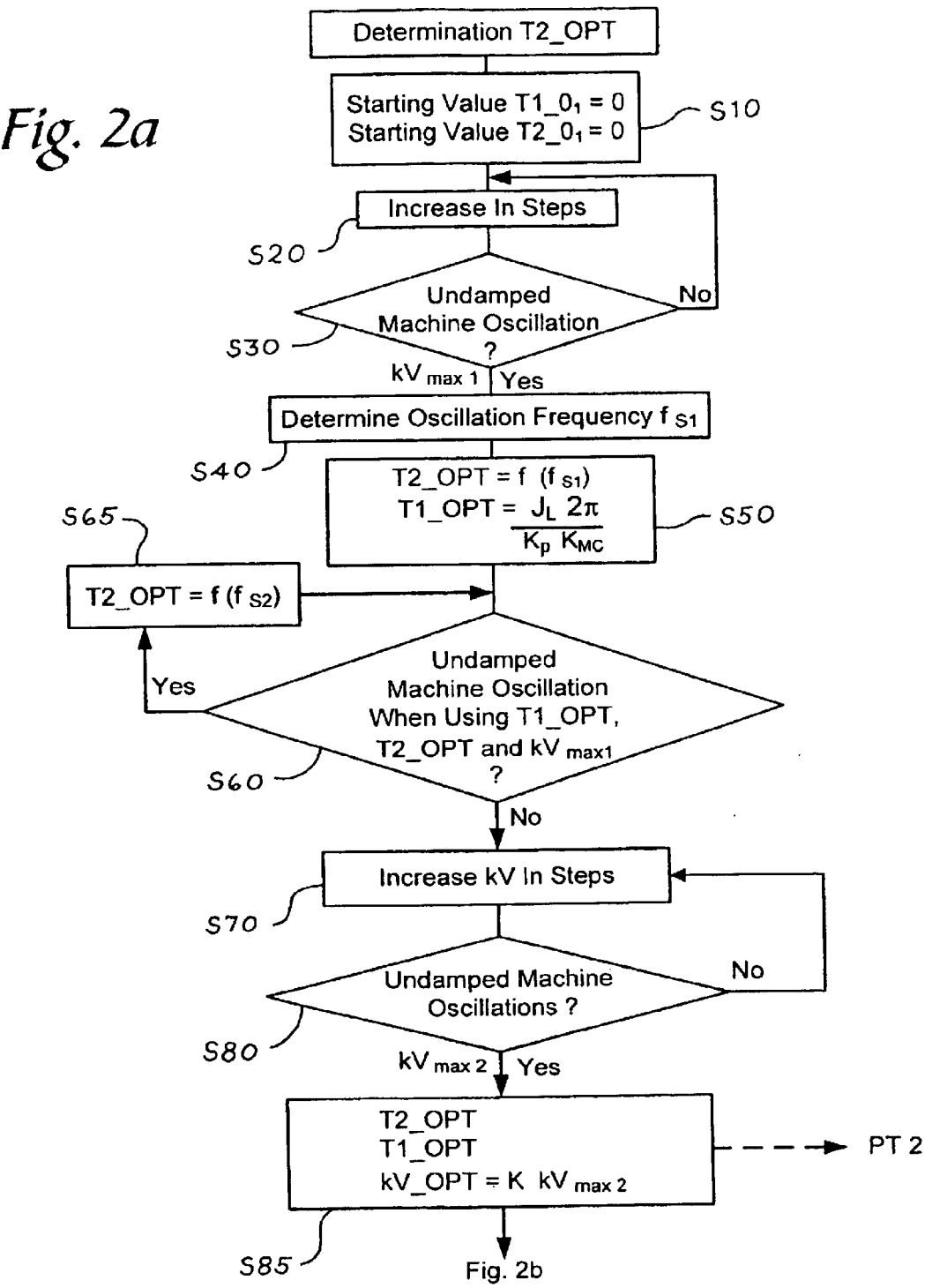

In the first part of the method explained in what follows, represented in FIG. 2a, first the time constant T2, or a correspondingly optimized value T2_OPT of the second time constant T2 will be determined.

In a first method step S10, first the determination, or presetting, of starting values $T1\_0_1$ and $T2\_0_1$ for the first and second time constant T1, T2 takes place. In the present example, the starting values $T1\_0_1$ and $T2\_0_1$ equaling $T1\_0_1=0$ and $T2\_0=0$ are selected. This selection of the starting values $T1\_0_1$ and $T2\_0_1$ equaling $T1\_0_1=0$ and $T2\_0_1=0$ means for the entire system in the end that the 2nd order reference model is switched out of the controlling arrangement, or is not active.

In what follows, the loop gain kV of the position control device is increased in steps in the following steps S20 and S30 and a check is made after each increase to determine whether an oscillation in the respective machine is already recognizable. This takes place until at a first maximum loop gain $kV_{max1}$ an almost undamped oscillation of the machine at a defined oscillation frequency $f_{S1}$ can be registered.

If an appropriate undamped oscillation of the machine can be registered, the associated oscillation frequency $f_{S1}$ is measured, or determined, in accordance with the method step S40.

Thereafter, in the method step S50, the two optimized values T2_OPT and T1_OPT can be determined for the two time constants T1, T2. Here, the optimized value T2_OPT for the second time constant T2 can be determined as a function of the oscillation frequency $f_{S1}$ determined in step S40, i.e.

$$T2\_OPT = f(f_{S1}) = 1/(2*\pi*f_{S1}) \qquad \text{Equ. (2)}$$

The optimized value T1_OPT for the first time constant T1 results from predetermined system parameters in accordance with the following equation:

$$T1\_OPT = (J_L*2*\pi)/(k_p*K_{MC}) \qquad \text{Equ. (3)}$$

wherein $J_L$: Momentary load, $k_p$: Loop gain of the proportional branch of the speed control device, $K_{MC}$: Motor constant.

Subsequently a check is performed in method steps S60 to S85 whether the previously determined time constants T1, T2 of the 2nd order reference model assure the desired control behavior during the controlling operation. Moreover, a maximum loop gain kV of the position control device for the optimized time constants T1_OPT, T2_OPT is set in these method steps.

For this purpose, initially a check is made in the method step S60 whether an undamped oscillation of the machine results in the system when using the previously determined optimized values T1_OPT, T2_OPT and the first maximum loop gain $kV_{max1}$ determined in step S30.

If this is not the case, the loop gain kV is increased by steps in method steps S70 and S80 until an undamped machine oscillation can be registered at a loop gain $kV_{max2}$. The maximum loop gain $kV_{max2}$ determined in this way at which, in connection with the time constants T1_OPT, T2_OPT of the 2nd order reference model, an undamped machine oscillation occurs, is subsequently multiplied by a safety factor K<1 in method step S85. From this then results the optimized loop gain kV_OPT for the position control device, which can be used for a stable system during controlling operations, i.e.

$$kV\_OPT = K \cdot kV_{max2} \qquad \text{(Equ. 4)}$$

The safety factor K can be selected as K=0.6, for example, in order to assure sufficient stability of the position control device in this way.

However, if it is found in method step S60 that, when using the previously optimized time constants T1_OPT, T2_OPT in the reference model and the loop gain $kV_{max1}$, an undamped machine oscillation already results at an oscillation frequency $f_{S2}$, the oscillation frequency $f_{S2}$ is determined and an optimized time constant T2_OPT is again determined in method step S65 as a function of the oscillation frequency $f_{S2}$ in accordance with $$T2\_OPT = f(f_{S2}) = 1/(2 \cdot \pi \cdot f_{S2}) \qquad \text{(Equ. 2')}.$$

If required, the determination of an optimized time constant T2_OPT is repeated several times in method steps S60 and S65, until finally no undamped machine oscillation can be registered at the selected parameters of T1_OP, T2_OPT.

In connection with machines of the first category, the second order reference model is basically parameterized after these steps, i.e. the two time constants T1 and T2 are determined. If it is intended to optimize the control structure of a machine of the second category, further method steps are required for suitably determining the first time constant T1 of the reference model in particular. This will be explained in what follows by means of FIG. 2b.

It is of course also possible to perform the following steps for determining a suitable first time constant T1 even with the mentioned machines of the first category in order to check in this way whether the value for T1_OPT set in accordance with the above Equ. (3) provides an acceptable system behavior.

Thus, for determining an optimized value T1_OPT' of the first time constant T1, first a second start value T1_0$_2$ for the first time constant T1 is set in method step S90. For this, the value for T1 determined in step S50 in accordance with Equ. (3) is used as the second start value T1_0$_2$, i.e. T1_0$_2$=T1_OPT.

Thereafter the first time constant T1 is changed in method step S100, for example increased, and a check is subsequently made in method step S120 whether an undamped machine oscillation can already again be registered. Besides the increase of the first time constant T1 in step S100 it would basically also be conceivable that it be decreased.

As long as no undamped machine oscillation can be registered, the loop gain kV is increased in method steps S110 and S120 stepwise up to a loop gain $kV_{max3}$, at which an undamped machine oscillation can be registered.

A check is thereupon made in method step S130, whether the loop gain $kV_{max3}$ determined in this way is greater than the loop gain $kV_{max2}$, which had been maximal up to this time. If it is, then the amplification factor $kV_{max3}$ is set equal to $kV_{max2}$ per step S135 and the method continues with step 100.

If the loop gain $kV_{max3}$ is greater than the loop gain $kV_{max2}$, which had been maximal up to this time, the loop gain $kV_{max3}$ is set to equal $kV_{max2}$, and a run-through of the method steps starting with S100 takes place again. This means that a check is made in the end whether with a changed value for T1_OPT a higher value for the loop gain kV can possibly be set.

This takes place until in method step S130 it is determined that the loop gain $kV_{max3}$ is no longer greater than the loop gain $kV_{max2}$ determined during the previous run-through.

In accordance with method step S140, the value for the first time constant T1 then present, besides the already previously determined value T2_OPT, is used as the optimized value T1_OPT for parameterizing the 2nd order reference model.

Furthermore, similar to the procedure in FIG. 2a, the last determined maximum loop gain $kV_{max2}$ is multiplied by a correction factor K<1, in order to again assure the stability of the position control device, i.e. the optimized value kV_OPT for the loop gain of the position control device again results as $$kV\_OPT = K \cdot kV_{max2} \qquad \text{Equ. (5)}$$

Thus, besides the two determined parameters T1 and T2 for the 2nd order reference model to be used, there is now also an optimized maximum loop gain kV_OPT for the position control device, which can be used in the subsequent controlling operation.

Alternative forms of embodiment also exist within the scope of the present invention.

The theoretical considerations on which the present invention is based will be explained in greater detail in what follows in the following description and several simulations and test results will be presented.

Theory, Simulation and Test Results
1. Simulation with a Simplified Controlling Model
1.1 Model of the Controlled System The method of the present invention and the arrangement of the present invention were tested by a mathematical simulation. This simulation which, besides the mathematical machine model, also contains the mathematical model of the present invention, will be described in what follows.

The mass inertia moment of the controlled system, together with the momentary constants of the motor, are the defining characteristics of the system. The following parameters are used in connection with this:

Mass inertia $J_L = 50$ kgcm$^2$

Motor constant $k_{MC} = (1.5/2) \cdot (Nm/A_{eff})$, wherein $A_{eff}$ is known in the art to represent an effective motor current which is measured in Amperes Therefore, the controlled system G(s) is determined by:

$$G(s) = (num/den) = 1/(J_L \cdot s).$$

The conversion from the radian frequency ω to U/s (U represents the number of rotations) takes place by a downstream-connected P-element with $1/(2 \cdot \pi)$. A disturbance can be introduced via the input "momentary disturbance Ms", which simultaneously affects the momentary value and the actual rpm. This is intended to correspond to a typical disturbance because of a milling cutter action and is used to rate the disturbance rigidity.

For simulating realistic rpm-connected losses, a derivative feedback k'p of the internal system output to the momentary summing point takes place. By this a new controlled system G'(s) is created:

$$G'(s) = (1/(J_L \cdot s))/(1 + k_p'/(J_L \cdot s))$$

$$G'(s) = (1/(k_p' + (J_L \cdot s)))$$

$$G'(s) = 1/k_p' \cdot 1/(1 + (J_L/k_p' \cdot s))$$

A TP1 control device is created by this derivative feedback.

Figure 3:
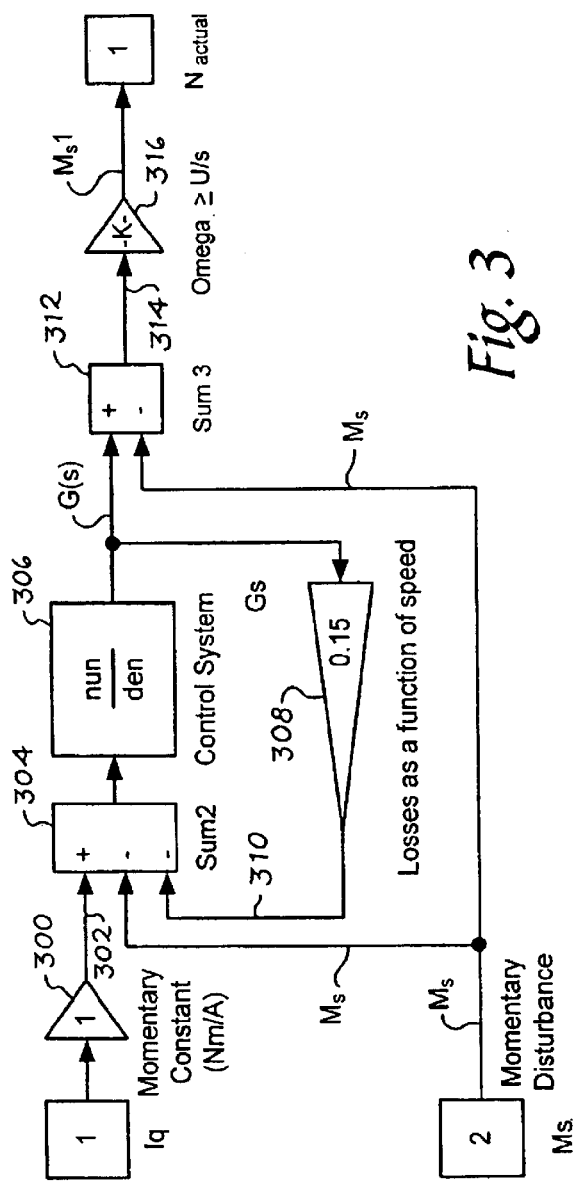

A model of the 1$^{st}$ order controlled system with disturbance introduction is represented in FIG. 3. As shown in FIG. 3, a signal $1q$ is fed to an amplifier 300 that multiplies the signal $1q$ by a momentary constant to generate a signal 302 that is fed to adder 304 A momentary disturbance signal Ms is fed to the adder 304. As shown in FIG. 3, the adder 304 is connected to a control system 306 that generates the signal G(s)=(num/den) which is fed to a component 308 that generates a loss signal 310 that is a function of rpm. The loss signal 310 is fed back to the adder 304. The signal G(s) and the signal Ms are each fed to a second adder 312 that adds the two signals to generate signal 314. The signal 314 is then fed to an amplifier 316 to generate signal Msl.

1.2 Model of the Disturbed Controlled System

Figure 4:
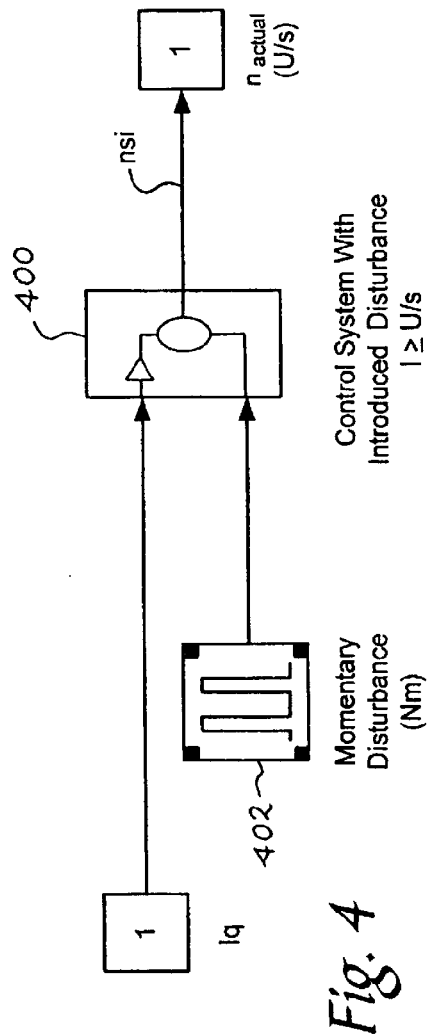

A model of the disturbed controlled system is represented in schematic form in FIG. 4. The controlled system is charged with a disturbance pulse of 2 Nm and of a length of 70 ms. The start time lies at 40 ms.

As shown in FIG. 4, the signal $1q$ is fed to a control system 400 with controlled disturbance that is supplied by a momentary disturbance device 402. The control system generates a resultant signal nsi.

This disturbed controlled system is integrated into a simulation as a group "disturbed controlled system A->U/s".

1.3 Simulation Model

Figure 5:
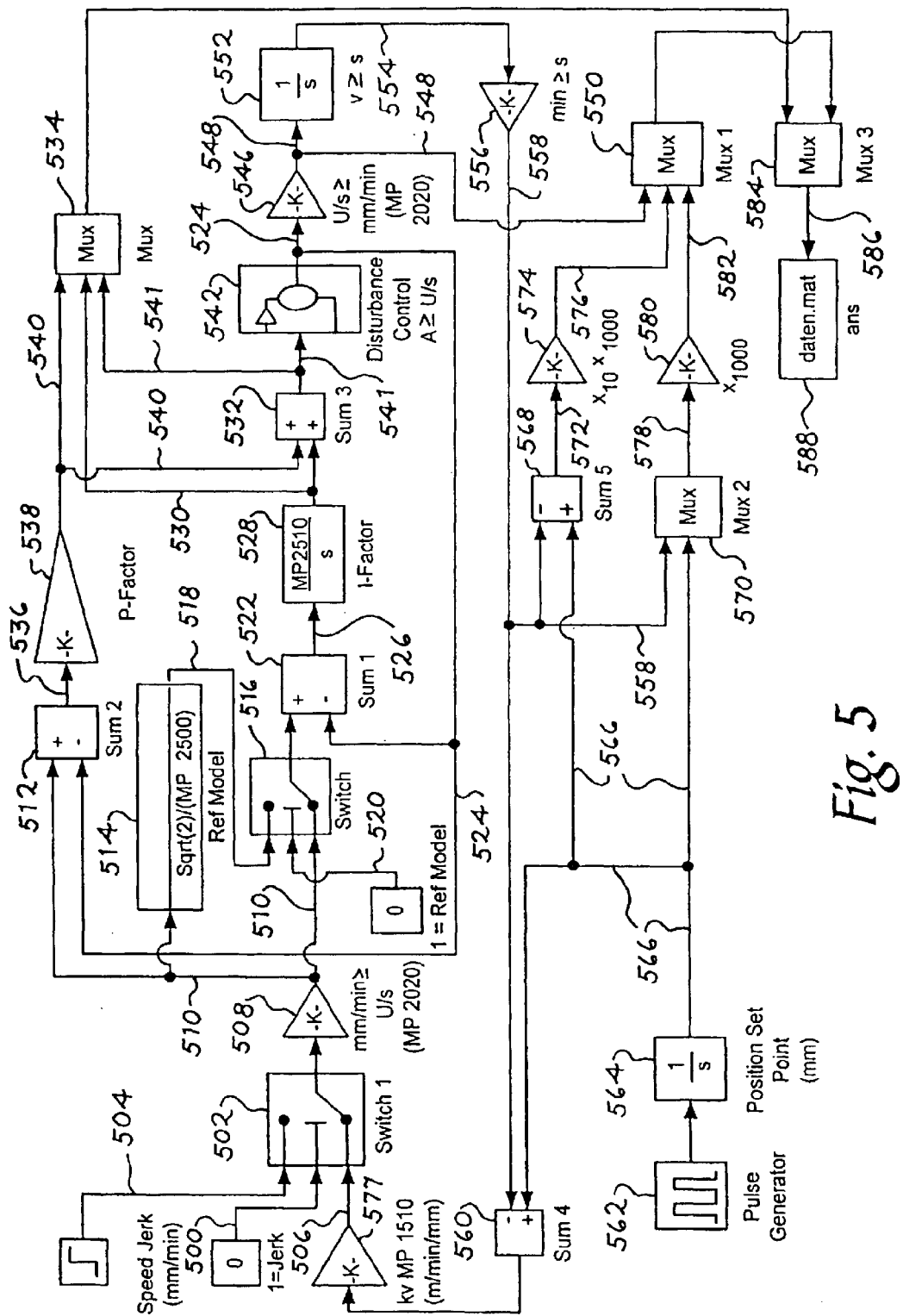

The simulation model contains a closed position control device loop. For alignment purposes of the speed control device it is possible to introduce a skip of 200 mm/min to the speed control device via a switch 1. A suitable simulation model for examining a 1st order reference model is represented in FIG. 5. The IPC reference model can be switched on and off with the switch upstream of Sum 1.

As shown in FIG. 5, a jerk signal 500 is fed to a switch 502 along with an rpm jerk signal 504 and a feedback signal 506. The switch 502 sends one of the three signals 500, 504, 506 to an amplifier 508 where the signal is multiplied to generate a resultant signal 510. The resultant signal 510 is sent to an adder 512, a reference model component 514 and a second switch 516. At the reference model component 514, the resultant signal 510 is operated by the factor (2)/MP2500 and the signal 518 is fed to the switch 516. The switch 516 selects one of the signals 518, 510 and a reference model signal 520. The selected signal is sent to an adder 522 that adds the selected signal with a disturbance signal 524. The combined signal 526 is fed to component 528 that applies the factor MP2510/s to generate signal 530 that is fed to adder 532 and multiplexer 534.

At the adder 512, the resultant signal 510 is added to the disturbance signal 524 to generate a signal 536 that is fed to amplifier 538 that multiplies the signal 536 by a factor that results in signal 540 that is later fed to adder 532 and multiplexer 534. The adder 532 generates a signal 541 that is fed to control system 542 that adjusts the signal 541 to take into account disturbance effects. The signal 524 output from the control system 542 is fed back to both adder 512 and adder 522. The signal 524 is also fed to an amplifier 546 that generates a signal 548 that is fed to multiplexer 550 and component 552 that applies the factor 1/s. The signal 554 generated by component 552 is fed to amplifier 556 and the amplified signal 558 is fed to adder 560.

A pulse generator 562 generates a signal that is operated by a point set point component 564 that applies a factor 1/s to generate signal 566. The signal 566 is fed to both adder 560, adder 568 and multiplexer 570. The adder 568 adds the signals 558 and 566 to generate signal 572 that is multiplied in amplifier 574 and the signal 576 is fed to multiplexer 550. The adder 560 adds signals 558 and 566 to generate a signal that is amplified by amplifier 577 to generate feedback signal 506.

The multiplexer 570 generates a signal 578 that is fed to amplifier 580 and the signal 582 is fed to multiplexer 550. The multiplexer 550 sends its signal to a multiplexer 584 that also receives a signal from multiplexer 534. The multiplexer 584 generates a signal 586 that is received by component 588 that is a MATLAB data file where all resulting simulation data results are stored and from which all graphs shown in FIGS. 6–12, 14–17 and 20 are extracted.

2. Determination of the Simulation Parameters

It was necessary to determine the control device amplifications for parameterizing the control devices.

2.1 Alignment of the Speed Control Device

For the alignment of the speed control device the disturbance moment of the controlled system was temporarily set to 0, and the switch 1 was set to skip. The skip size was 200

Once the skip size is set to 200 mm/min the kinematics and current flow of the system are represented by the graphs of FIG. 6. In particular, the top graph represents the position (mm)/velocity (mm/s) of the system as a function of time (s). The curve sactual represents the actual position, snominal the nominal position, sdiff is snominal−sactual and vactual is the actual velocity. The lower graph maps the various currents (A) of the system versus time (s). The curve $1(ki)$ represents the current of the integral branch motor current, the curve $1(kp)$ represents the proportional branch motor current and $1q=1(ki)+1(kp)$. Similar graphs are presented in FIGS. 7–10, 14–17 and 20. One difference in the graphs is that the graphs of FIGS. 14–17 and 20 is that the time scale is in minutes.

The conditions represented in FIG. 6 resulted for the loop gains for

P-factor (speed control device)=9

I-factor (speed control device)=2200 of the control device.

The simulation results correspond to a real drive mechanism. The control star time was set as Ta=4.6 ms.

2.2 Determination of the Position Control Device Amplification kV

To determine the maximum position control device amplification, the I-portion of the speed control device was set to 0.

Position control device amplification=15

P-factor (speed control device)=9

I-factor (speed control device)=0

The kV factor was set such that no oscillation of the actual motor current Iq occurred.

The low disturbance rigidity without the I-portion can be seen from the contour variation curve in FIG. 7. No complete removal of the disturbance takes place.

2.3 Activating the I-Portion of the Speed Control Device

The I-portion of the speed control device was activated without the position control device amplification being reduced.

Position control device amplification=15

P-factor (speed control device)=9

I-factor (speed control device)=2200

In accordance with FIG. 8 it can be easily seen from the motor currents that the system oscillates. The kV factor (or the I-portion of the speed control device) must be reduced.

2.4 Reduction of the Position Control Device Amplification

The kV factor of the position control device was reduced until there was no longer a tendency to oscillate.

Position control device amplification=9

P-factor (speed control device)=9

I-factor (speed control device)=2200

The contour variation increases (bad control behavior) because of the smaller kV factor, but the disturbance rigidity is improved in comparison with a system without an I-portion (see FIG. 9).

2.5 Series-Connection of the IPC Reference Model (1st Order) with the I-Portion

The kV factor, which in the beginning had been possible without the I-portion of the speed control device, was set. In addition, the I-portion of the aligned speed control device was set. The reference model was realized in the 1st order (neglecting the derivative loss feedback of the controlled system).

Position control device amplification MP1510 [m/min/mm]=15 P-factor (speed control device)

MP2500 [As]=9 I-factor (speed control device) MP2510 [A]=2200, wherein A represents Amperes.

Figure 10:
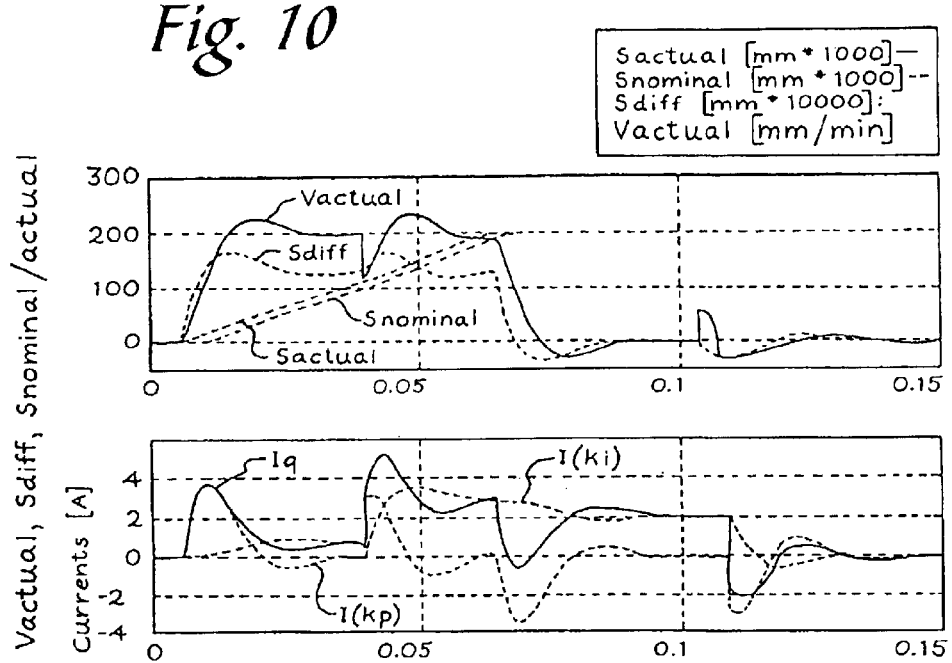

It is possible to read out of the diagram in FIG. 10, that with a low contour variation a large disturbance rigidity is provided.

3. Calculation of the IPC Reference Model

The basis for the reference model is that all portions of the P control device, including the system, do not reach the integrator. Therefore a simplified model of the closed control loop (only the P control device is active) was inserted into the set point default of the integrator. The motor losses are not considered.

3.1 Calculation from Model Parameters

The following physical values appear in this closes control loop:

P-factor speed control device: in [As/U]
Motor constant: kMC/sqrt(2) in [Nm/A]
Moment of mass inertia of the system $J_L$ Thus, the conversion function G(s) of the open control loop is:

$$G(s)=MP2500 \ast k_{MC} \ast 1/(2 \ast \pi) \ast 1/(J_L \ast s)$$

$$k_p'=MP2500 \ast k_{MC} \ast 1/(2 \ast \pi)$$

$$G(s)=k_p' \ast 1/([J_L]J_L \ast s)$$

The conversion function H(s) of the closed control loop is:

$$H(s)=G(s)/(1+G(s))$$

$$H(s)=(k_p'/(J_L \ast s))/(1+(k_p'/(J_L \ast s)))$$

$$H(s)=1/(1+(J_L \ast s)/k_p')$$

$$H(s)=1/(1+T_1 \ast s)$$

A PT1 element with the time constant T1 is obtained as the IPC reference model:

$$T_1=J_L/k_p'=(J_L \ast 2 \ast \pi)/(MP2500 \ast k_{MC}) \quad (F1)$$

3.2 Calculation from Machine Parameters

Heidenhain controls have an acceleration feedforward control, which can be set by a machine parameter. This machine parameter MP26 provides the reciprocal value of the angular acceleration a per current in [As²/U]. The time constant of the IPC can be calculated in a simple manner by the angular acceleration.

Mel=Electrical moment [Nm]
kMC=Momentary motor constant [Nm/A]
$J_L$=Moment of mass inertia [kgm²]
MP26=Acceleration feedforward control [As²/U]

$$M_{el}=I_{MOT} \ast k_{MC}$$

$$\alpha=M_{el}/J_L$$

$$\alpha=(I_{MOT} \ast 2 \ast \pi)MP26$$

This is equal to:

$$J_L/k_{MC}=(MP26)/2 \ast \pi$$

This inserted in (F1):

$$T_1=J_L/k_p'=(J_L \ast 2 \ast \pi)/(MP25 \ast k_{MC})$$

$$T_1=MP26/MP25 \quad (F2).$$

Although the IPC should be assigned to the integral factor of the speed control device, the IPC-MP should be among the feedforward control parameters, since it can only be used after MP26 has been determined.

4. Examination of the Phase Response of the Speed Control Device Loop

To examine the phase response, the phase shift of the closed speed control circuit is examined. A simulation model which contains, inter alia, the set point and actual speed, is used for this. The following phase responses were determined here.

4.1 Phase Response without IPC

Figure 11:
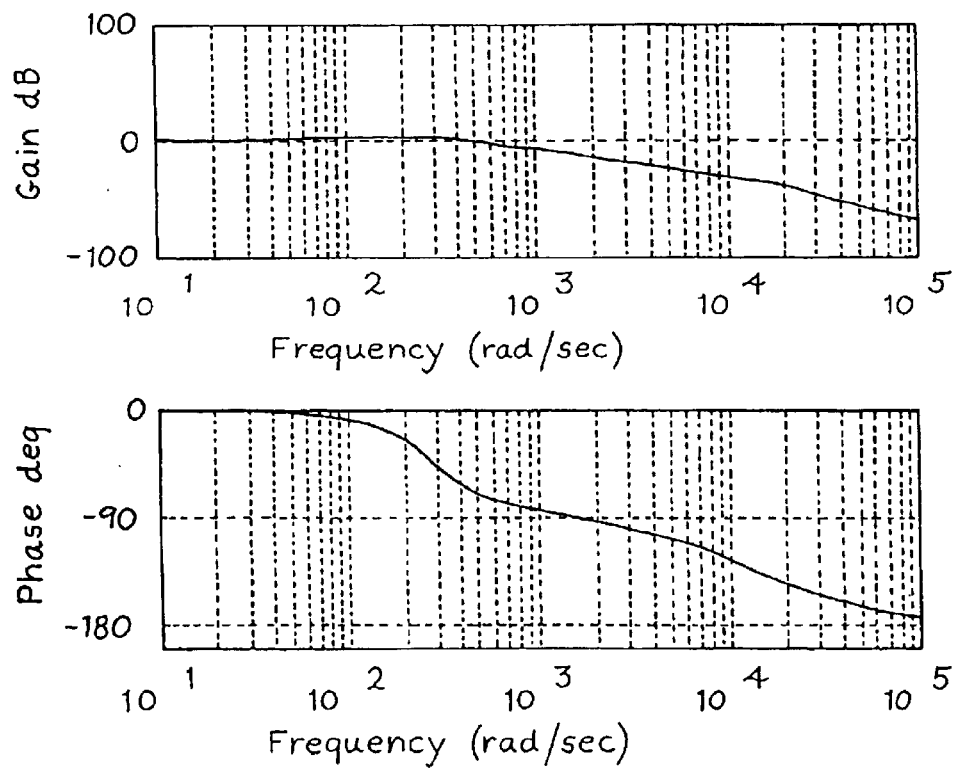

The phase response without IPC is represented in FIG. 11. It can be seen that a limit in the phase does not result sooner than at −180°. A reduction of the phase edge results because of the I-portion of the speed control device, together with additional delays, idle times and large masses.

4.2 Phase Response with IPC

Figure 12:
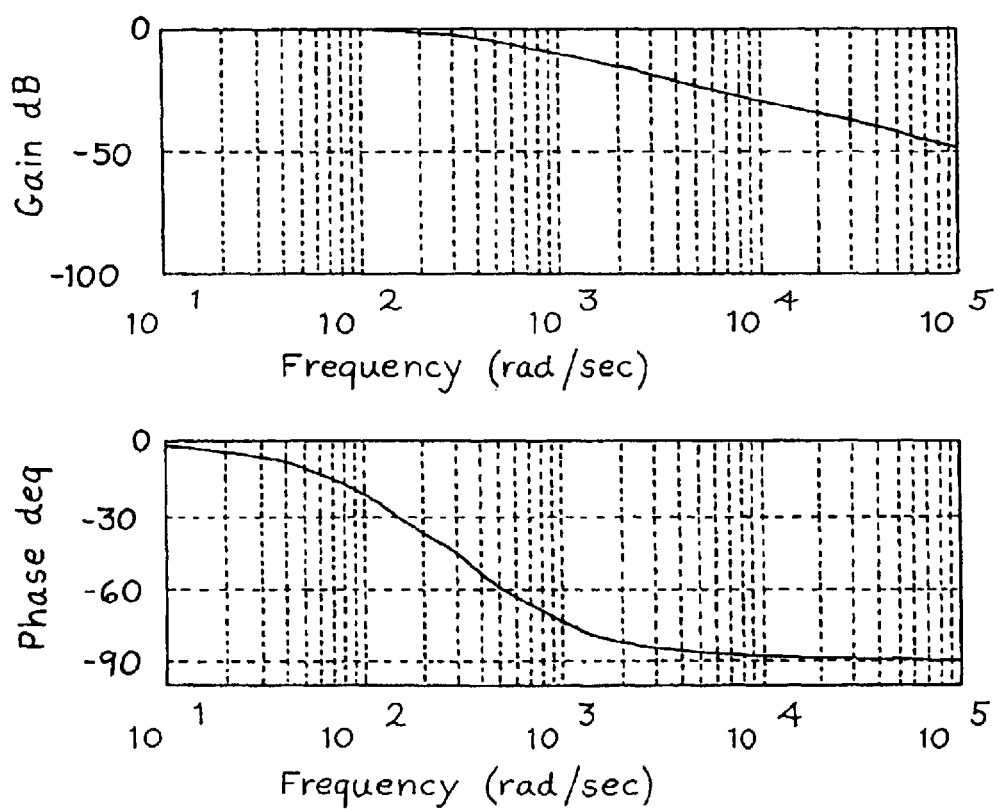

The phase response with IPC is represented in FIG. 12. With IPC the phase is only shifted by maximally −90°. Greater stability (or higher kV) of the position control device ensue because of the increase in the phase edge.

Please note that the graphs shown in FIGS. 11 and 12 are known as Bode diagrams which are used to characterize the behavior of a filter. In particular, the upper graphs of FIGS. 11 and 12 show the amplitude/gain response of the filter. The lower graphs show the phase response of the filter. The x-axis represents the frequency over a certain range.

5. Consideration of the IPC in Feedforward Control

All previous reflections were made without feedforward controls (dragged operation). In what follows, the feedforward control will be included.

For reasons of clarity, the speed control device in the simulation model was realized in its own block and was equipped with the following inputs (from top to bottom):

Switching the IPC on or off
Switching the feedforward control on or off
Acceleration feedforward control from the interpolator (IPO)
Speed feedforward control from the IPO
Set point rpm
Actual rpm.

The speed control block has the following outputs:
Three signals (via a multiplexer) for monitoring the currents in the speed control device
Momentary current output Iq of the speed control device.

Figure 13:
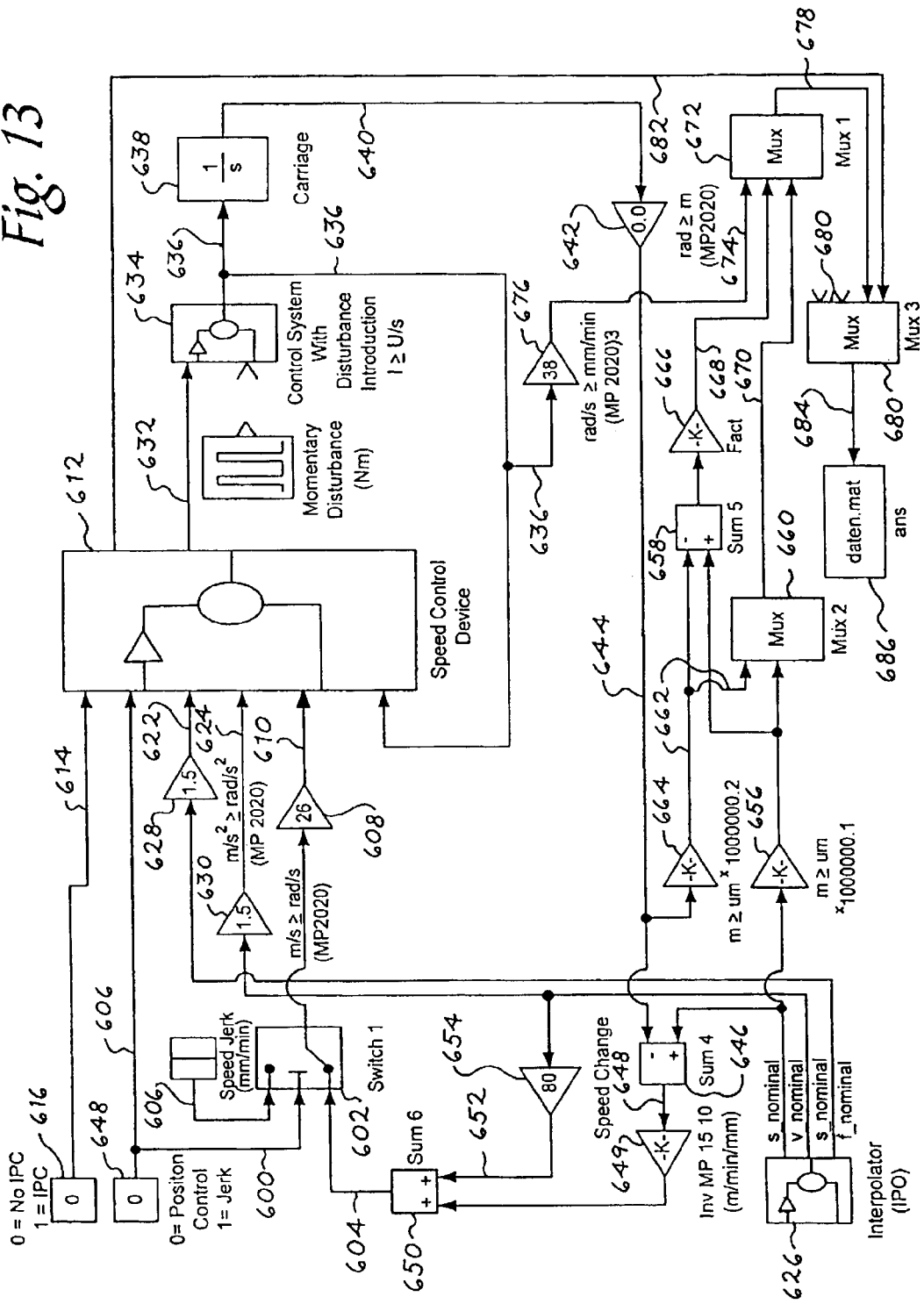

The structure of the position control device simulation with feedforward control is represented in FIG. 13. The speed feedforward control (Sum6) had additionally been integrated into the position control circuit.

By connecting the disturbance moment with the appropriate input of the controlled system, a disturbance can act as before on the controlled system.

The system allowance comes from the interpolator block (IPO). It is possible to perform a parameterization of jerk, acceleration, speed and distance via the Matlab dataset "M_IPO.M". "M_IPO.M" is also called up within "M_IPC.M".

As shown in FIG. 13, a jerk signal 600 is fed to a switch 602 along with a speed feedforward control signal 604 and an rpm jerk signal 606. The switch 602 sends one of the three signals to an amplifier 608, which applies MP2020 to generate a signal 610 that is fed to the speed control system 612.

The speed control system 612 receives five other signals. One of the signals 614 is generated by the IPC component 616 and another of the signals is the jerk signal 600. The two other signals 622, 624 are initiated by interpolator 626 where the a_soll and w_soll signals from the interpolator are amplified by amplifiers 628, 630, respectively, that apply M02020 to generate the resultant signals received by the control system 612.

The control system 612 generates a signal 632 that is received by a control system with disturbance introduction 634 whose output signal 636 is fed back to the control system 612 and a component 638 that applies 1/s to the signal which results in signal 640. Signal 640 is fed to an amplifier 642 that applies MP2020 to generate a signal 644 that is received by adder 646 that also receives a signal s_soll. The adder 644 combines the two signals to provide a signal 648 that is amplified via amplifier 649 and received by adder 650. The adder 650 sums the signal from amplifier 649 with a signal 652 that is the result of the amplification, via amplifier 654, of signal a_soll generated by the interpolator 626. The speed control signal 604 is then fed back to the switch 602.

As shown in FIG. 13, the signal s_soll is also fed to an amplifier 656 that sends the amplified signal to an adder 658 and a multiplexer 660. The adder 658 receives a signal 662 that is the result of the amplification of signal 644 via amplifier 664. The signal 662 is also sent to multiplexer 660. The multiplexer 660 and the adder 658, in combination with amplifier 666, send signals 668, 670 to a multiplexer 672. The multiplexer 672 also receives a signal 674 from an amplifier 676 that amplifies signal 636.

The multiplexer 672 generates a signal 678 that is fed to multiplexer 680. The multiplexer 676 also receives a signal 682 from the controller 612. The multiplexer 680 generates a signal 684 that is received by component 686 that is a MATLAB data file where all resulting simulation data results are stored and from which all graphs shown in FIGS. 6–12, 14–17 and 20 are extracted 5.1 Simulations of Following Errors In what follows, the various feedforward controls are sequentially switched in. To compare the effects, all simulation parameters were kept constant.

System Parameters:
Momentary constant Ktc[Nm/A]=1.5*sqrt(2)
Momentary load inertia $J_L$[kgm$^2$]=9
Rpm losses Nm/ω=0.15
Control device circuit parameters:
Position control device amplification MP1510 m/min/mm=9
P-factor (speed control device) MP2500 [As]=9
I-factor (speed control device) MP2510 [A]=2200
Interpolation parameters:
Jerk r [m/s$^3$]2*10$^3$
Acceleration a [m/s$^2$]=5
Speed v [m/s]=0.4/60
Position s [m]=4*10$^{-4}$.

5.1.1 Following Error without Feedforward Control

Figure 14:
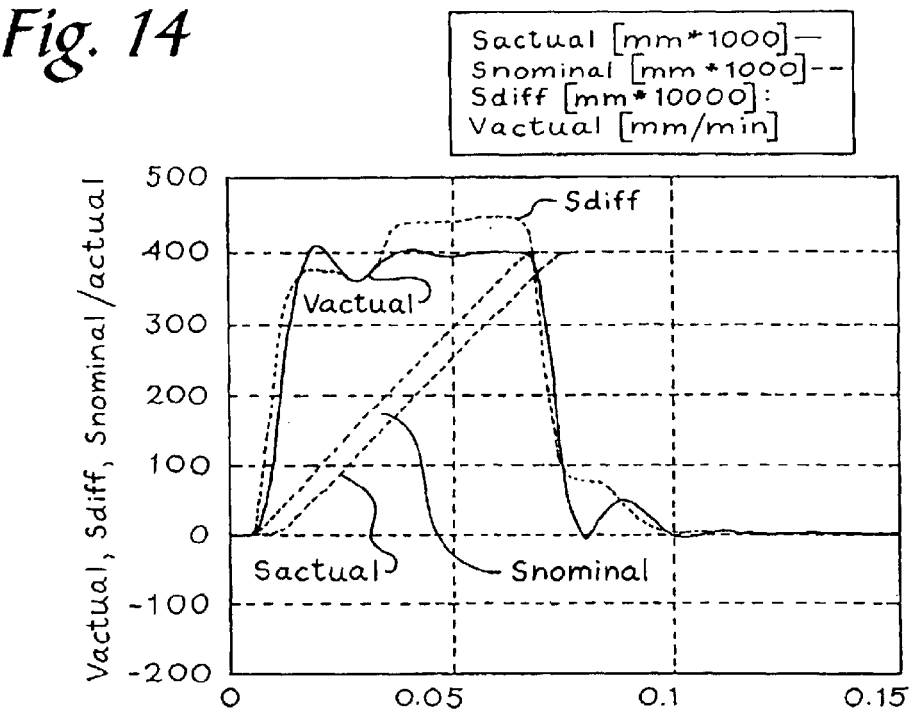

The resulting following error without feedforward controls is represented in FIG. 14. A maximum following error of approximately 45 μm results, which is impermissibly high.

5.1.2 Following Error with Speed Feedforward Control

Figure 15:
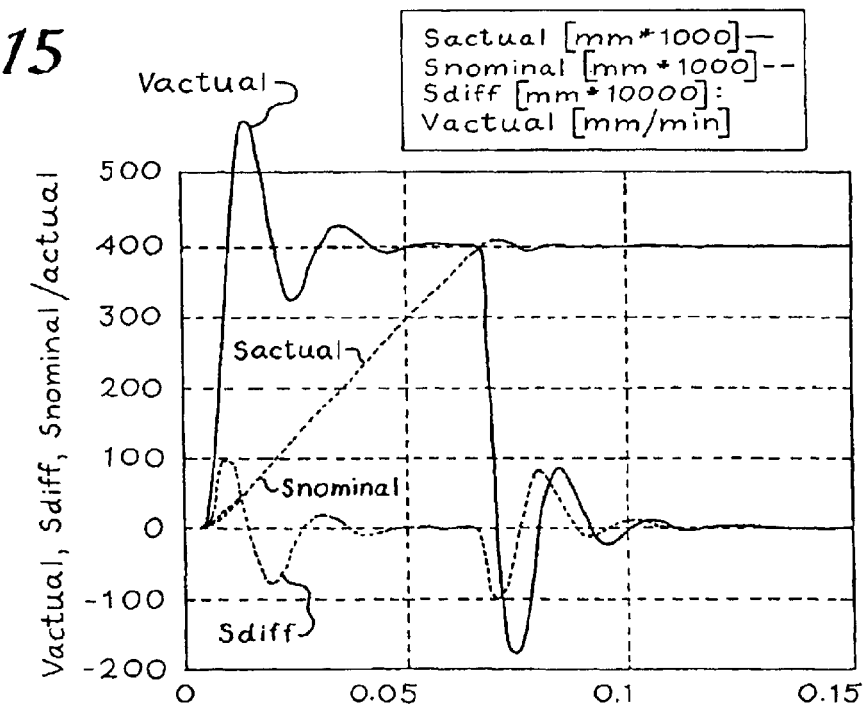

The resulting following error without feedforward controls is represented in FIG. 15. A maximum following error during the acceleration phase of 10 μm results.

5.1.3 Following Error with Acceleration Feedforward Control

Figure 16:
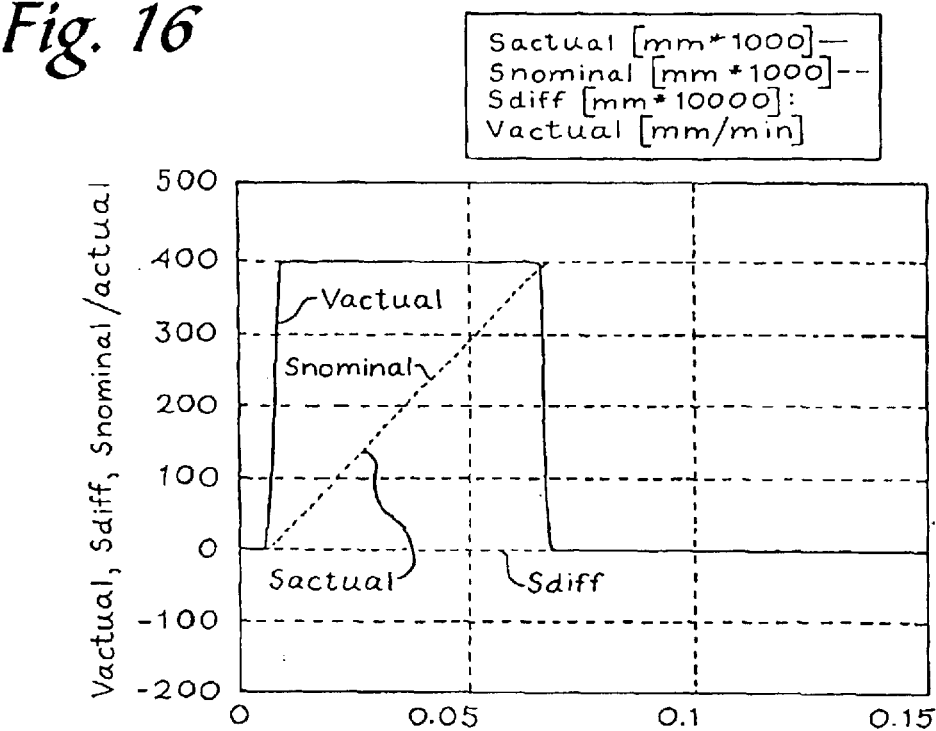

The resulting following error with acceleration feedforward control is represented in FIG. 16. As can be seen, no following error can be shown.

5.1.4 Following Error with IPC (Without IPC Feedforward Control)

Figure 17:
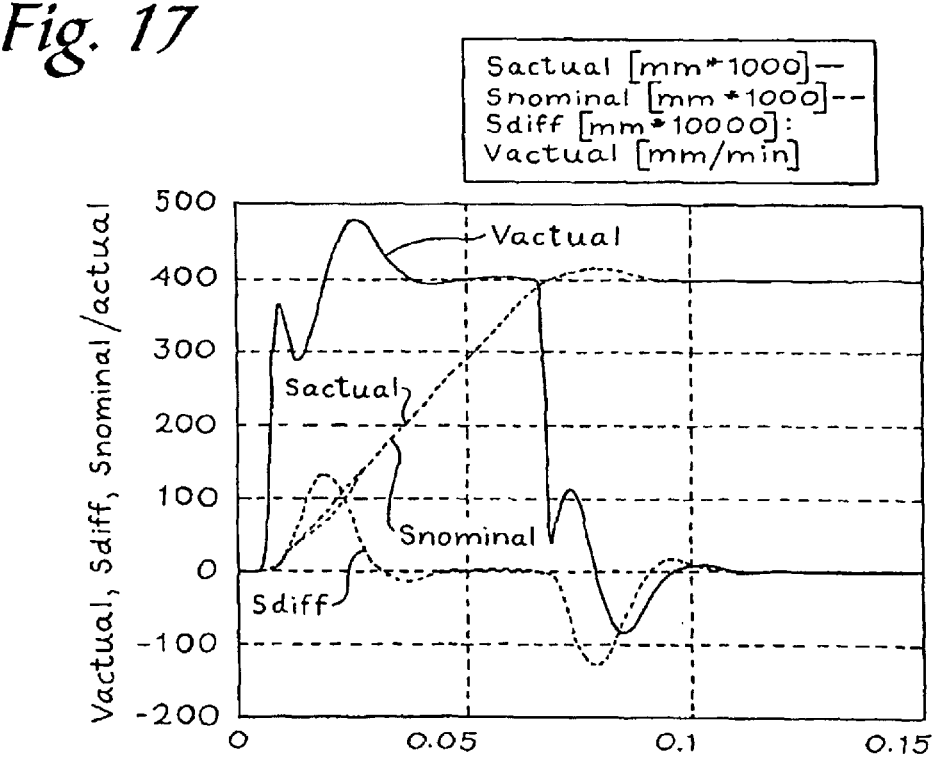

The resulting following error with feedforward control and IPC (without IPC feedforward control) is represented in FIG. 17. As can be seen, a following error of 13 μm is built up at the end of the acceleration phase.

5.2 Installation of an IPC Feedforward Control into the Speed Control Device

To reduce the following error during the acceleration phase it is necessary to implement an acceleration feedforward control. Since the input value of the IPC is a speed, a multiplication of the acceleration feedforward control a_soll(ipo) with the time constant T1 is necessary.

To make possible an implementation with optimized computing time, the feedforward control summing point was moved ahead from the control device output to the IPC input, the structure represented in FIG. 18 results in the process, i.e. IPC with acceleration feedforward control.

As shown in FIG. 18, a resultant signal 700 is formed as the combination of the product of signals a_soll and $T_1$ being added to the signal n_soll. The resultant signal 700 is fed to the IPC 702 which generates a signal 704 that is added with the signal n_ist so as to form a signal 706. The signal 706 is then fed to an integral. branch 708.

A further correction of the following error can be achieved by means of a jerk feedforward control. The feedforward control value "r_soll(ipo)" can be formed in the speed control device by simple differentiation of "a_soll (ipo)". The time error of half a scanning time occurring in the process only plays a subordinate role.

The IPC with acceleration and jerk control is represented in FIG. 19. As shown in FIG. 19, a resultant signal 800 is formed as the combination of the signals r_soll, Tr, a_soll, $T_1$ and n_soll so that resultant signal 800 is fed to the IPC 802 which generates a signal 804 that is added with the signal n_ist so as to form a signal 806. The signal 806 is then fed to an integral branch 808 which in turn generates an output signal 810. The proportional branch 812 receives a signal 814 so as to generate an output signal 816 that is added with the output signal 810.

5.2.1 Following Error with Convent. Feedforward Control, IPC and IPC Pilot Control In the simulation the relevant feedforward controls were expanded with the above structure and compared with a structure wherein the feedforward control point is located at the control device output. No differences resulted here.

The resulting following error with conventional feedforward control, IPC and IPC feedforward control is represented in FIG. 20.

If the IPC feedforward control branch is installed, there is again no detectable following error.

Figure 21:
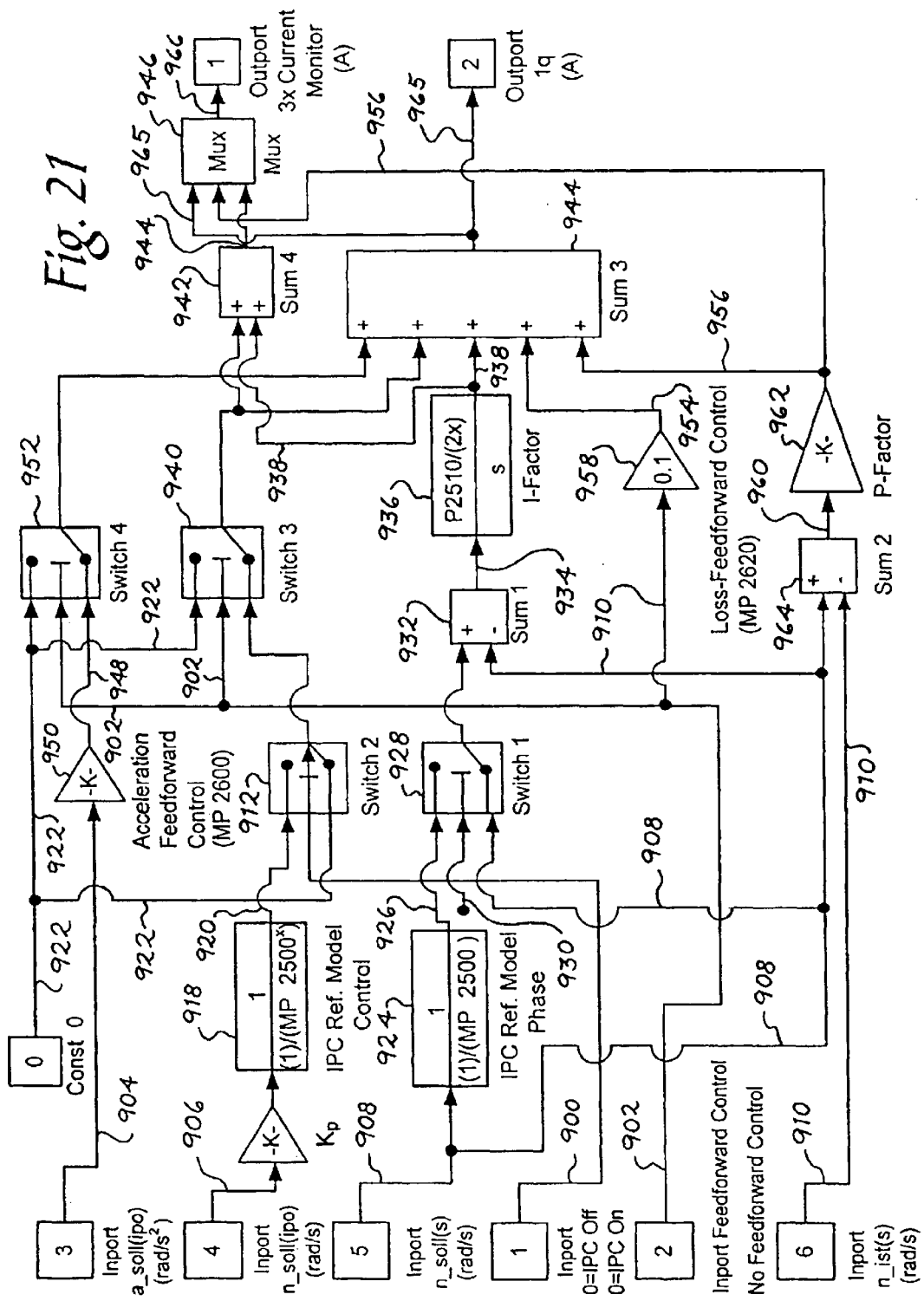

The structure of the speed control device block with feedforward control in the control device output is represented in FIG. 21. In particular, the structure includes six input signals 900, 902, 904, 906, 908, 910. The input signal 900 is fed to a switch 912. The input signal 906 is fed to an amplifier 914 where the amplified signal 916 is fed to an IPC model feedforward control 918 that applies the factor 1/MP2500. The resultant signal 920 is fed to switch 912. The switch 912 also receives a constant signal 922.

The signal 908 is fed to the IPC phase reference model control 924 that also applies the factor 1/MP2500 so as to generate signal 926 that is fed to switch 928. The switch 928 also receives signal 908 and signal 930. The switch 928 chooses one of the three signals 908, 926 and 930 and feeds them to an adder 932 that also receives signal 910. The added signal 934 is sent to a component 936 that applies the factor P2510/2*s so as to generate signal 938.

As shown in FIG. 21, the signal from the switch 912 and the signals 902 and 922 are sent to a switch 940 that sends one of the three signals to both adder 942 and adder 944. The adder 942 receives the signal from switch 940 and signal 938 and adds the two to generate signal 944 which is sent to multiplexer 946. The multiplexer 946 also receives signals 956 and 965 and sends a signal 966 to an output.

Signals 902, 922 and 948, which is the result of the amplification of signal 904 by amplifier 950 are sent to switch 952 where one of the three is sent to adder 944. The adder 944 receives two other signals 954 and 956. Signal 954 is the result of amplifying signal 910 by amplifier 958. Similarly, signal 956 is the result of amplifying signal 960 via amplifier 962. Signal 956 is the result of adding signals 908 and 910 by adder 964. As shown in FIG. 21, the signals from the switches 940, 952 and signals 938, 954 and 956 are combined by adder 944 to generate signal 965 that is sent to an output.

6. Practical Examination of the IPC

The practical examinations were performed on a DIGMA 700. Initially, a 1st order IPC, as had been employed in the above simulation, was implemented in the DSP software. Only small advantages result here when the IPC is used, the position control kv could only be increased by approximately 15%.

It was therefore necessary to use an IPC of higher order, which better corresponds to the real system conditions.

6.1 Use of a 2nd Order IPC

An implementation of the 2nd order IPC was used after the following conversion function:

$$H(s)=1/(1+(T_1*s)+(T_2*s^2))$$

This is the conversion function of a PT2 capable of oscillation with damping D.

$$D=\alpha/\beta=T_1/(2*T_2)$$

A damped oscillation is to be expected in actual machine tools. Therefore, damping D moves in the range 0<D<1.

The time constant T2 is calculated as follows:

$$T_2=T_1/(2*D)$$

Clearly improved results were already achieved with the use of a 2nd order IPC, however, they still did not approach the results of the simulation, which lead to conclusions of a theoretical increase of the position control amplification kv of approximately 170%. The following time constants were determined for the DIGMA 700:

Time Constants at DIGMA 700:

|  | X-axis | Y-axis | Z-axis |
| --- | --- | --- | --- |
| MP25 | 15 | 15 | 12 |
| MP26 | 0.0212 | 0.0205 | 0.0165 |
| T1' | 1 | 1 | 1 |
| T2' | 0.0017 | 0.0018 | 0.0018 |
| T1 | 1.41 ms | 1.37 ms | 1.37 ms |
| T2 | 1.7 ms | 1.8 ms | 1.8 ms |
| D | 0.41 | 0.39 | 0.38 |

The below table shows the position control amplifications (kV factors) achieved at the X-axis of the DIGMA 700 in connection with various IPC designs. A search for the oscillation threshold was always performed here. In accordance with a rule of thumb, the latter must always be multiplied by a factor of 0.65 for stable operations.

|  | kV (Oscillation limit) | kV (stable) |
| --- | --- | --- |
| Without IPC | 8.5 | 5.5 |
| 1st order IPC | 9.5 | 6.2 |
| 2nd order IPC (D = 0.5) | 13.0 | 8.5 |
| 2nd order IPC (D = 0.41) | 14.5 | 9.5 |

Thus, the position control amplification could be increased to 170%.

6.2 Derivation of the IPC Algorithm

The derivation of the IPC algorithm is based on the equation:

$$H(s)=1/(1+(T1*s)+(T2^2*s^2))$$

Determination of the T2 Time Constant

Tests with DIGMA 700 have shown that the T2 time constant, and therefore damping, is optimally set when the following error in the jerk phase showed a minimal deviation (with integrated jerk feedforward control). It was possible in this way to determine the T2 time constant for all three axes.

In the lab set-up (JL directly on the motor shaft) it was also possible to perform the determination of the optimum T2 time constant in this way.

Connection between Damping and T2 Time Constant $$D=T_1/(2*T_2)$$

6.3 Employment in Machines with Dominant Natural Frequency

A further employment option of the IPC is provided when in connection with machines with low natural resonance and insufficient damping the IPC time constants are matched to the controlled system.

In connection with first tests performed during production on the "Chiron FZ 22L" it was possible to increase the kV factor from 1 to 5. However, it was not possible in this case to use the time constant T1 determined from MP26 and MP25. It was necessary to employ a considerably higher time constant (approximately factor 5), which compensates a time constant in the machine.

In addition to "Chiron FZ 22L" a second machine, a Deckel-Mahon "DMU 50 V" was tested.

The Deckel-Mahon "DMU 50 V" machine has strong resonances at 42 Hz and 50 Hz. These are so dominant that it is only possible to set a jerk of 10 and an acceleration of 1.5 at kV=4. By means of the use of the IPC it was possible to achieve a kV of 12 for all axes. The values for jerk could be increased to 20, acceleration was raised to 3.

Time Constants at DMU 50 V:

|  | X-axis | Y-axis | Z-axis |
| --- | --- | --- | --- |
| MP25 | 15 | 4.8 | 5.4 |
| MP26 | 0.045 | 0.016 | 0.016 |
| T1' | 0.0042 | 0.0052 | 0.0052 |
| T2' | 0.003 | 0.0022 | 0.0013 |

-continued

|    | X-axis  | Y-axis  | Z-axis  |
|----|---------|---------|---------|
| T1 | 4.2 ms  | 5.2 ms  | 5.2 ms  |
| T2 | 3.0 ms  | 2.2 ms  | 1.3 ms  |
| D  | 0.70    | 1.18    | 2.00    |

The speed control device settings were not changed (original Deckel-Maho).

Result: A noticeable improvement in the position control device behavior could be achieved with both machines by the use of the IPC.

7. IPC Adjustment

When using the IPC it is necessary to differentiate between two types of machines. Type 1 is a rigid machine of not too large structural size, which is mostly directly driven or has linear motors. Type 2 is a machine with a dominant natural frequency in the range between 15 Hz to 80 Hz, in which no sufficiently large kV factor can be set.

7.1 Adjustment of Rigid Machines

With machines of the type 1 it is sufficient as a rule if the IPC is switched on with T1'=1 and T2'=0. The kV factor is increased until a noticeable oscillating tendency is noticed in the process.

Once this kV factor has been found, a fine adjustment of the IPC time constant T2 takes place. To this end first a T2 starting value of $$T2=2/3*MP26/MP25$$

is set. Thereafter T2' is changed until a new maximum kV factor has been found. Usually the T2 time constant must be reduced with this machine type (down to maximally 0.5×the starting value). However, an increase with respect to the starting value is also conceivable.

At the end the kV factor for the oscillation threshold must be multiplied by the factor 0.65 in order to assure a sufficient stability of the position control device.

With this type of machine an increase of the kV by a factor of 1.4 to 1.7 is possible.

7.2 Adjustment of Machines with Dominant Natural Frequencies

With machines of the type 2, the same adjustment should initially be performed as with machine of the type 1. The IPC must be switched on with T1'=1, and it is necessary to determine T2. In this case it is also possible that a T2 time constant results which is clearly greater than the T2 starting value.

Now the T1 time constant must be determined. For this purpose a T1 starting value must be entered into MP2602 in place of a 1. It is calculated from $$T1=MP26/MP25$$

This starting value must be increased until a maximum kV factor has been found. If the found T1 time constant is clearly greater than the starting value (>factor 2), another adjustment of the T2 time component should take place. The value so far found should be lower, or raised, during testing.

Finally, the kV factor for the oscillation threshold must be multiplied by the factor 0.65 in order to assure a sufficient stability of the position control device.

With machines of the type 2 a greater increase of the kV than by the factor 1.7 is possible.

The foregoing description is provided to illustrate the invention, and is not to be construed as a limitation. Numerous additions, substitutions and other changes can be made to the invention without departing from its scope as set forth in the appended claims.

I claim:

1. A method for determining at least one time constant of a reference model, which is designed as a 2nd order time-delay element of a machine, said method comprising:

detecting an oscillation frequency of an undamped machine oscillation; and determining an optimized value of a time constant of said reference model as a function of said detected oscillation frequency of said undamped machine oscillation, wherein said reference model is arranged in a cascaded control arrangement and is located between a position control device with a loop gain and a closed speed control device, which comprises a proportional branch and an integral branch, and wherein said reference model at least essentially simulates the behavior of said closed speed control circuit without taking said integral portion into consideration.

2. The method of claim 1, comprising:

presetting a starting value of said time constant;

presetting a starting value of a second time constant of said reference model; and increasing a loop gain of said position control device in steps up to a first maximum loop gain, at which an undamped machine oscillation is registered.

3. The method of claim 2, wherein said starting value of said time constant is preset to zero and said starting value of said second time constant is preset to zero.

4. The method of claim 2, wherein said optimized value is determined in accordance with the equation:

$$T2\_OPT=f(f_{S1})=1/(2*\pi*f_{s1}),$$ wherein $f_{s1}$=said oscillation frequency.

5. The method of claim 2, wherein said second time constant is determined from preset system parameters.

6. The method of claim 5, wherein said second time constant is determined in accordance with the equation:

$$T1\_OPT=(J_L*2*\pi)/(k_p*K_{MC})$$

wherein $J_L$: Momentary load, $k_p$: Loop gain of the proportional branch of the speed control device, $K_{MC}$: Motor constant.

7. The method of claim 5, further comprising checking whether said previously determined time constant assures a desired control behavior of said position control device.

8. The method of claim 7, wherein said increasing of said loop gain is accomplished by using said optimized time constant, until an undamped machine oscillation is registered, and an associated loop gain is used as a second maximum loop gain during subsequent operation of said method.

9. The method of claim 8, further comprising multiplying said second maximum loop gain by a safety factor K, wherein K<1.

10. The method of claim 5, further comprising checking whether said second time constant provides an acceptable system behavior, or whether an optimization of said second time constant must be performed.

11. The method of claim 10, further comprising optimizing said second time constant by, proceeding from said starting value for said second time constant, changing said second time constant in steps until said undamped machine oscillation is registered, and a value of said optimized second time constant obtained therefrom is used as an optimized value for parameterizing said reference model.

12. The method of claim 11, further comprising:
using said optimized time constant and said second time constant; and
increasing said loop gain until an undamped machine oscillation is registered, and using an associated loop gain as a second maximum loop gain in subsequent operation of said method.

13. The method of claim 1, wherein said optimized value is determined in accordance with the equation:

$$T2\_OPT = f(f_{S1}) = 1/(2*\pi*f_{s1}),\text{ wherein }f_{s1}=\text{said oscillation frequency.}$$

14. The method of claim 1, wherein said method is exercised in an automated manner.

15. The method of claim 14, wherein said machine theoretically requires an nth order reference model, wherein n>2 applies.

16. The method of claim 1, further comprising using in said machine said reference model with said optimized value of said time constant.

17. A method for determining at least one time constant of a reference model, which is designed as a 2nd order time-delay element of a machine, said method comprising:
detecting an oscillation frequency of an undamped machine oscillation; and
determining an optimized value of a time constant of said reference model as a function of said detected oscillation frequency of said undamped machine oscillation, wherein said optimized value is determined in accordance with the equation:

$$T2\_OPT = f(f_{S1}) = 1/(2*\pi*f_{s1}),\text{ wherein }f_{s1}=\text{said oscillation frequency.}$$

18. A method for determining at least one time constant of a reference model, which is designed as a 2nd order time-delay element of a machine, said method comprising:
detecting an oscillation frequency of an undamped machine oscillation, and
determining an optimized value of a time constant of said reference model as a function of said detected oscillation frequency of said undamped machine oscillation, wherein said machine theoretically requires an nth order reference model, wherein n>2 applies and said method is exercised in an automated manner.

19. The method of claim 18, further comprising using in said machine said reference model with said optimized value of said time constant.

20. A device for determining at least one time constant of a reference model, which is designed as a 2nd order time-delay element of a machine, said device comprising:
a reference model arranged in a cascaded control arrangement;
a position control device with a loop gain;
a closed speed control device, which comprises a proportional branch and an integral branch and wherein said reference model is located between said position control device and said closed speed control device;
a detector for detecting an oscillation frequency of an undamped machine oscillation; and
an optimizer that determines an optimized value of a time constant of said reference model as a function of said detected oscillation frequency of said undamped machine oscillation.

21. The device of claim 20, wherein said reference model at least essentially simulates the behavior of said closed speed control circuit without taking said integral portion into consideration.

* * * * *